United States Patent
Lee et al.

(10) Patent No.: US 8,656,120 B2
(45) Date of Patent: Feb. 18, 2014

(54) DEVICE, METHOD AND COMPUTER-READABLE MEDIUM RELOCATING REMOTE PROCEDURE CALL DATA IN HETEROGENEOUS MULTIPROCESSOR SYSTEM ON CHIP

(75) Inventors: Seung Won Lee, Hwaseong-si (KR); Young Sam Shin, Yongin-si (KR); Shi Hwa Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 335 days.

(21) Appl. No.: 12/923,408

(22) Filed: Sep. 20, 2010

(65) Prior Publication Data

US 2011/0072231 A1    Mar. 24, 2011

(30) Foreign Application Priority Data

Sep. 21, 2009  (KR) ........................ 10-2009-0088988

(51) Int. Cl.
*G06F 12/00*   (2006.01)

(52) U.S. Cl.
USPC ................... 711/158; 711/165; 711/E12.002

(58) Field of Classification Search
None
See application file for complete search history.

(56) References Cited

U.S. PATENT DOCUMENTS

2005/0081181 A1* 4/2005 Brokenshire et al. ......... 717/100

FOREIGN PATENT DOCUMENTS

| JP | 1994-004312 | 1/1994 |
| JP | 1997-160856 | 6/1997 |
| JP | 2005-534084 | 11/2005 |
| JP | 2007-220086 | 8/2007 |
| JP | 2008-186357 | 8/2008 |

* cited by examiner

*Primary Examiner* — Reginald Bragdon
*Assistant Examiner* — Thanh D Vo
(74) *Attorney, Agent, or Firm* — Staas & Halsey LLP (57) ABSTRACT

Disclosed is a device, method and computer-readable medium relocating Remote Procedure Call (RPC) data in a heterogeneous multiprocessor System-on-Chip (MPSoC). The method, for example, includes determining a memory where data is to be stored based on a use of a parameter of a function, and data access patterns of a function caller and a function callee, and storing the data in the determined memory.

19 Claims, 7 Drawing Sheets

| ACCESS PATTERN | INPUT PARAMETER | OUTPUT PARAMETER |
|---|---|---|
| CALLER MAJOR (FIRST PATTERN) | ARM DRAM | ARM DRAM |
| CALLEE MAJOR (SECOND PATTERN) | SPM | SPM |
| BOTH MAJOR (THIRD PATTERN) | ARM DRAM→SPM | SPM→ARM DRAM |
| NONE (FOURTH PATTERN) | ARM DRAM | SRP DRAM |

DEVICE, METHOD AND COMPUTER-READABLE MEDIUM RELOCATING REMOTE PROCEDURE CALL DATA IN HETEROGENEOUS MULTIPROCESSOR SYSTEM ON CHIP

CROSS-REFERENCE TO RELATED APPLICATIONS

This application claims the benefit of Korean Patent Application No. 10-2009-0088988, filed on Sep. 21, 2009, in the Korean Intellectual Property Office, the disclosure of which is incorporated herein by reference.

BACKGROUND

1. Field

Example embodiments of the following description relate to a device, method and computer-readable medium relocating Remote Procedure Call (RPC) data in a heterogeneous Multiprocessor System-on-Chip (MPSoC), and more particularly, to a device, method and computer-readable medium relocating data associated with a function call in an RPC scheme in a heterogeneous MPSoC.

2. Description of the Related Art

In the hardware industry, a multi-core system with a plurality of cores has been developed. Since performance improvement based on an increase in clock frequency has reached its limit due to problems of power consumption and heating, other types of evolution to the multi-core system are required. Additionally, a heterogeneous Multiprocessor System-on-Chip (MPSoC) with a single system including heterogeneous cores is superior in performance compared with a homogenous MPSoC.

In the heterogeneous MPSoC, several memories exist and different amounts of clock cycles are consumed when accessing memories for each core, and thus, it is important to determine a memory on the heterogeneous MPSoC where data is to be arranged.

Thus, there is a demand for a method, device and computer-readable medium to efficiently relocate data using a Remote Procedure Call (RPC) scheme between heterogeneous cores to reduce costs incurred by data transfer and data access.

SUMMARY

The foregoing and/or other aspects are achieved by providing a method of relocating Remote Procedure Call (RPC) data in a heterogeneous multiprocessor System-on-Chip (MPSoC), the method including analyzing, by a computer, a use of a parameter of a function, determining, by the computer, a program with a highest accessibility to data associated with the parameter, determining, by the computer, a memory where the data is to be stored based on the analyzed use of the parameter and a location of the program, and storing, by the computer, the data in the determined memory.

The analyzing of the use of the parameter may include analyzing whether the parameter is used as one of an input parameter and an output parameter.

The determining of the program may include determining an accessibility of a function caller to the data associated with the parameter and an accessibility of a function callee to the data associated with the parameter, and classifying at least one access pattern based on the determined accessibilities.

The classifying of the at least one access pattern may include classifying the access patterns into one of a first pattern where the accessibility of the function caller is equal to or greater than a predetermined reference value, a second pattern where the accessibility of the function callee is equal to or greater than the predetermined reference value, a third pattern where both of the accessibility of the function caller and the accessibility of the function callee are equal to or greater than the predetermined reference value, and a fourth pattern where both the accessibility of the function caller and the accessibility of the function callee are less than the predetermined reference value.

When the access pattern is classified as the first pattern, the determining of the memory includes determining a memory to store both of data associated with an input parameter and data associated with an output parameter, the memory located closest to the function caller.

When the access pattern is classified as the second pattern, the determining of the memory includes determining a memory to store both of data associated with an input parameter and data associated with an output parameter, the memory located closest to the function callee.

When the access pattern is classified as the third pattern, the determining of the memory includes determining a memory to copy data associated with an input parameter from a first memory to a second memory, and to copy data associated with an output parameter from the second memory to the first memory, the first memory located closest to the function caller and the second memory located closest to the function callee.

When the access pattern is classified as the fourth pattern, the determining of the memory includes determining a first memory to store data associated with an input parameter and determining a second memory to store data associated with an output parameter, the first memory located closest to the function caller and the second memory located closest to the function callee.

The foregoing and/or other aspects are achieved by providing a device relocating Remote Procedure Call (RPC) data in a heterogeneous multiprocessor System-on-Chip (MPSoC), the device including a parameter analyzer to analyze a use of a parameter of a function, an access pattern determiner to determine a program with a highest accessibility to data associated with the parameter, a storage memory determiner to determine a memory storing the data based on the analyzed use of the parameter and a location of the program, and a data storage unit to store the data in the determined memory.

According to another aspect of one or more embodiments, there is provided at least one computer readable medium including computer readable instructions that control at least one processor to implement methods of one or more embodiments.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to ike elements throughout. Embodiments are described below to explain the present disclosure by referring to the figures.

Figure 1:
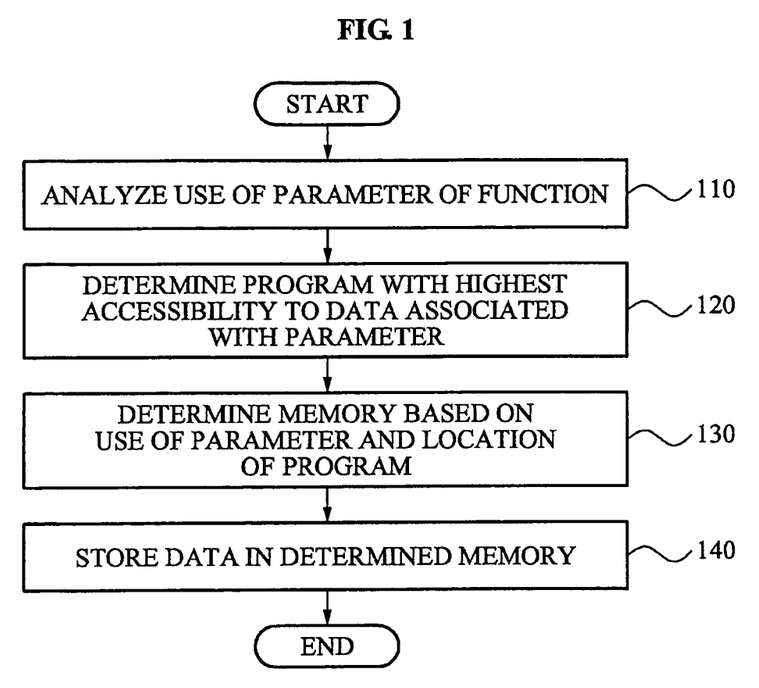
FIG. 1 illustrates a flowchart of a method of relocating Remote Procedure Call (RPC) data in a heterogeneous multiprocessor System-on-Chip (MPSoC) according to example embodiments.

FIG. 1 illustrates a flowchart of a method of relocating Remote Procedure Call (RPC) data in a heterogeneous multiprocessor System-on-Chip (MPSoC) according to example embodiments.

Referring to FIG. 1, in operation 110, a use of a parameter of a function may be analyzed. The parameter may be used as either an input parameter or an output parameter. In other words, the parameter may be analyzed to determine whether the parameter is used as an input parameter or an output parameter. Here, the input parameter refers to a parameter transferred by a function caller to a function callee, and the output parameter refers to a parameter transferred by the function callee to the function caller to return a result value.

In operation 120, a program with a highest accessibility to data associated with the parameter may be determined. Operation 120 may include determining an accessibility of a function caller to the data associated with the parameter and an accessibility of a function callee to the data associated with the parameter, and classifying one or more access patterns based on the determined accessibilities. In other words, operation 120 may be performed to determine whether the function caller or the function callee most frequently accesses the data, or to determine whether both of the function caller and the function callee frequently access the data.

Here, the access patterns may be classified, for example, into four patterns based on the accessibility of the function caller and the accessibility of the function callee. The four patterns may include a first pattern where the accessibility of the function caller is equal to or greater than a predetermined reference value, a second pattern where the accessibility of the function callee is equal to or greater than the predetermined reference value, a third pattern where both of the accessibility of the function caller and the accessibility of the function callee are equal to or greater than the predetermined reference value, and a fourth pattern where both the accessibility of the function caller and the accessibility of the function callee are less than the predetermined reference value. The accessibilities may be determined using at least one of an access frequency, an access data size, and an access time.

In operation 130, a memory may be determined to store the data based on the use of the parameter and a location of the program with the highest accessibility to the data. Specifically, to avoid an unnecessary memory copy and to reduce a data access time, the use of the parameter and the location of the program may be used to determine a memory to store the data.

For example, when the access pattern is classified as the first pattern, a first memory may be determined to store data associated with an input parameter, and a second memory may be determined to store data associated with an output parameter. When the access pattern is classified as the second pattern, the second memory may be determined to store data associated with an input parameter, and the first memory may be determined to store data associated with an output parameter. Additionally, when the access pattern is classified as the third pattern, data associated with an input parameter may be determined to be copied from the first memory to the second memory, and data associated with an output parameter may be determined to be copied from the second memory to the first memory. Furthermore, when the access pattern is classified as the fourth pattern, the first memory may be determined to store both of data associated with an input parameter and data associated with an output parameter. Here, the first memory may be located closest to the function caller, and the second memory may be located closest to the function callee.

In operation 140, data may be stored in the determined memory. Accordingly, data may be stored in a memory determined based on the use of the parameter, and the access pattern. Thus, it is possible to avoid an unnecessary data copy and optimize the data access time.

As described above, in the heterogeneous MPSoC, the location of the memory where data is stored may be changed based on the use of the parameter and the access pattern and thus, it is possible to prevent costs from being incurred by data transfer between remote functions, and to minimize the data access time.

Figure 2:
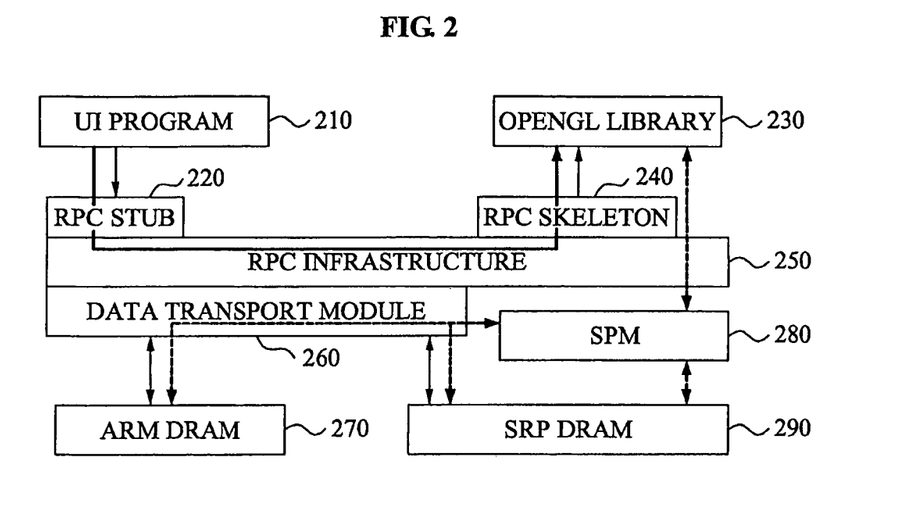
FIG. 2 illustrates a diagram of an architecture of an RPC system relocating data in a heterogeneous MPSoC according to example embodiments.

FIG. 2 illustrates an architecture of an RPC system relocating data in a heterogeneous MPSoC according to example embodiments.

Referring to FIG. 2, the architecture of the RPC system may include a plurality of cores, and a plurality of functions may be respectively mapped to the plurality of cores exhibiting optimal performances. In FIG. 2, to show an operation of transferring a function call, it is assumed that a User Interface (UI) program 210 running on an Advanced RISC Machine under ARM-based Linux calls a function in an OpenGL library 230 running on a Samsung Multiplatform Kernel (SMK) based on a Samsung Reconfigurable Processor (SRP).

An RPC stub 220 may run on the ARM-based Linux machine to transfer a function call. Additionally, the RPC stub 220 may convert a name and data of the called function into a message.

An RPC infrastructure 250 may transfer the converted message to an RPC skeleton 240 running on the SMK.

The RPC skeleton 240 may restore the received message to its original form, namely, the name and data of the function in the OpenGL library 230, so that the function may be called. A result of executing the function may be transferred to the UI program 210 in reverse from the above description.

When a parameter of the function is defined as a pointer to indicate a data address, a data transport module 260 may perform a data transfer among an ARM Dynamic Random Access Memory (DRAM) 270, a Scratch Pad Memory (SPM) 280, and an SRP DRAM 290.

To avoid unnecessary data copy or unnecessary data transfer, the data transport module 260 may enable data to be arranged in an appropriate memory based on a use of a parameter and a data access pattern. Hereinafter, an operation of relocating data in an appropriate location based on the use of the parameter and the data access pattern will be further described with reference to FIG. 3.

Figure 3:
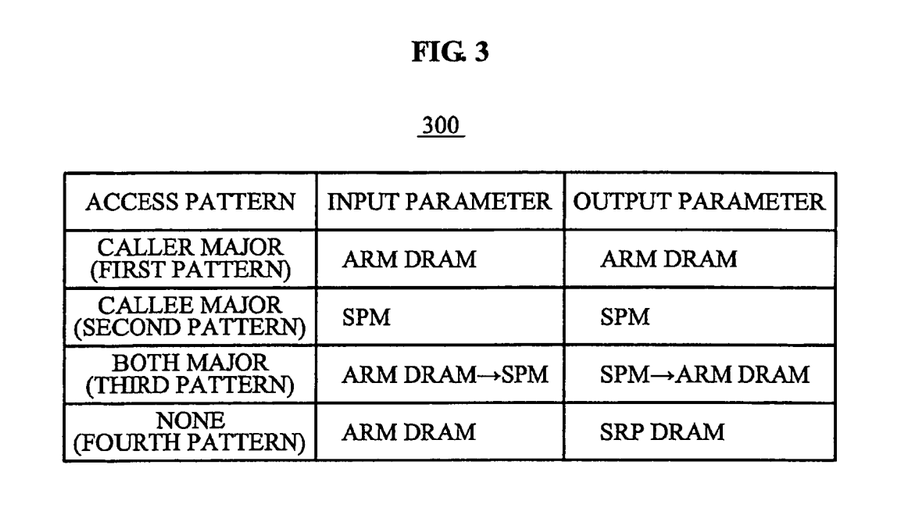
FIG. 3 illustrates a table of a location of data stored based on an access pattern and a use of a parameter, according to example embodiments.

FIG. 3 illustrates a table 300 of a location of data stored based on the access pattern and the use of the parameter, according to example embodiments.

Referring to FIG. 3, when the UI program 210 is used as a function caller, and the OpenGL library 230 is used as a function callee, a data accessibility of the function caller and a data accessibility of the function callee may be determined. Here, the data accessibility may be determined based on at least one of an access frequency, an access data size, and an access time with respect to the function caller or the function callee. For example, an access amount may be calculated by multiplying a number of times the function caller accesses data by a size of the data, and the calculated access amount may be multiplied by an access time, to determine the accessibility of the function caller. In this example, when the calculated access amount is equal to or greater than a predetermined reference value, the accessibility of the function caller may be determined to be high. Likewise, an access amount of the function callee may be calculated and the accessibility of the function callee may be determined in the same manner as the function caller. When the calculated access amount of the function callee is equal to or greater than a predetermined reference value, the accessibility of the function callee may be determined to be high.

As shown in the table 300 of FIG. 3, access patterns may be classified into four patterns, namely, a first pattern where the function caller has a high data accessibility and the function callee has a low data accessibility, a second pattern where the function caller has a low data accessibility and the function callee has a high data accessibility, a third pattern where both of the function caller and the function callee have high data accessibilities, and a fourth pattern where the function caller and the function callee access data once. Additionally, memories where data is to be located may be classified based on the access patterns and the use of the parameter.

Specifically, in the first pattern, data of an input parameter and data of an output parameter may be stored in an ARM DRAM located closest to a function caller that frequently accesses the data. In the second pattern, data of an input parameter and data of an output parameter may be stored in an SPM located closest to a function callee that frequently accesses the data. Additionally, in the third pattern, when both a function caller and a function callee frequently access data, data of an input parameter may be copied to the SPM, and data of an output parameter may be copied to the ARM DRAM. In the fourth pattern, when the function caller accesses data once, and when the function callee accesses data once, data of an input parameter may be stored in the ARM DRAM, and data of an output parameter may be stored in an SPM or an SRP DRAM, so that the data may be located in a memory close to a portion where data is generated. In this example, when the data of the output parameter is stored in the SRP DRAM, not in the SPM, the SPM may be used for other purposes.

Figure 4:
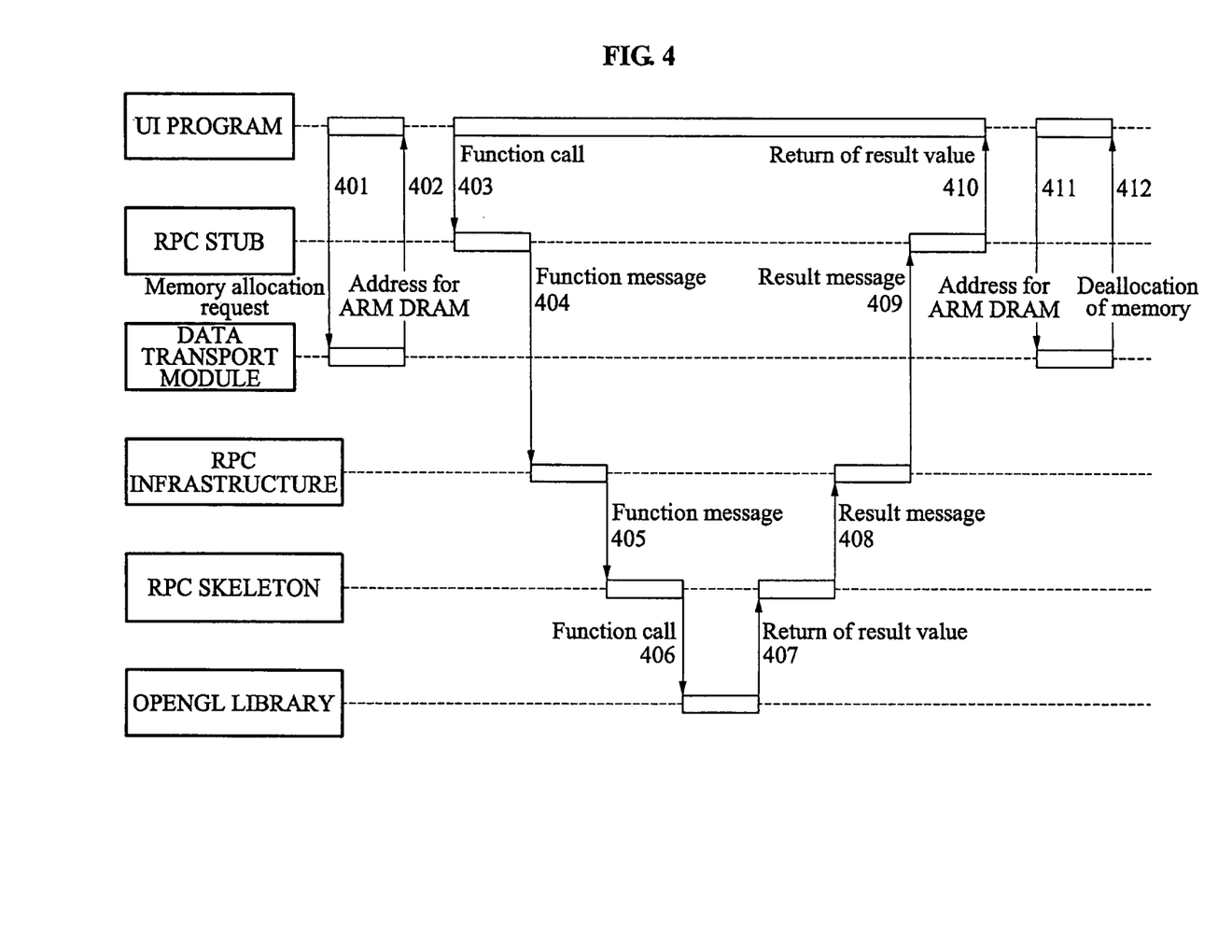
FIG. 4 illustrates a diagram of an RPC flow when a function caller has a high data accessibility, according to example embodiments.

FIG. 4 illustrates an RPC flow when a function caller has a high data accessibility, according to example embodiments.

Referring to FIG. 4, in operations 401 and 402, a UI program may request a data transport module to allocate a memory, and the data transport module may transfer an address for an ARM DRAM to the UI program.

When the UI program transfers a "function call" command to an RPC stub in operation 403, the RPC stub may convert a name and data of a function into a message and may transfer the converted message to an RPC skeleton through an RPC infrastructure in operations 404 and 405.

In operation 406, the RPC skeleton may restore the received message to its original form, namely, the name and data of the function, and may call the function in an OpenGL library. The called function may be executed to generate a result value, and the generated result value may be returned to the RPC skeleton in operation 407.

In operation 408, the RPC skeleton may transfer a result message with the result value to the RPC infrastructure. In operation 409, the RPC infrastructure may transfer the received result message to the RPC stub.

In operation 410, the RPC stub may return the result value of the received result message to the UI program.

In operations 411 and 412, the address for the ARM DRAM may be transferred to the data transport module, and a memory may be deallocated.

As described above, when the function caller has high data accessibility, data of an input parameter and data of an output parameter may be stored in the ARM DRAM that is located close to the function caller. Thus, it is possible to minimize the access time and avoid unnecessary data copy.

Figure 5:
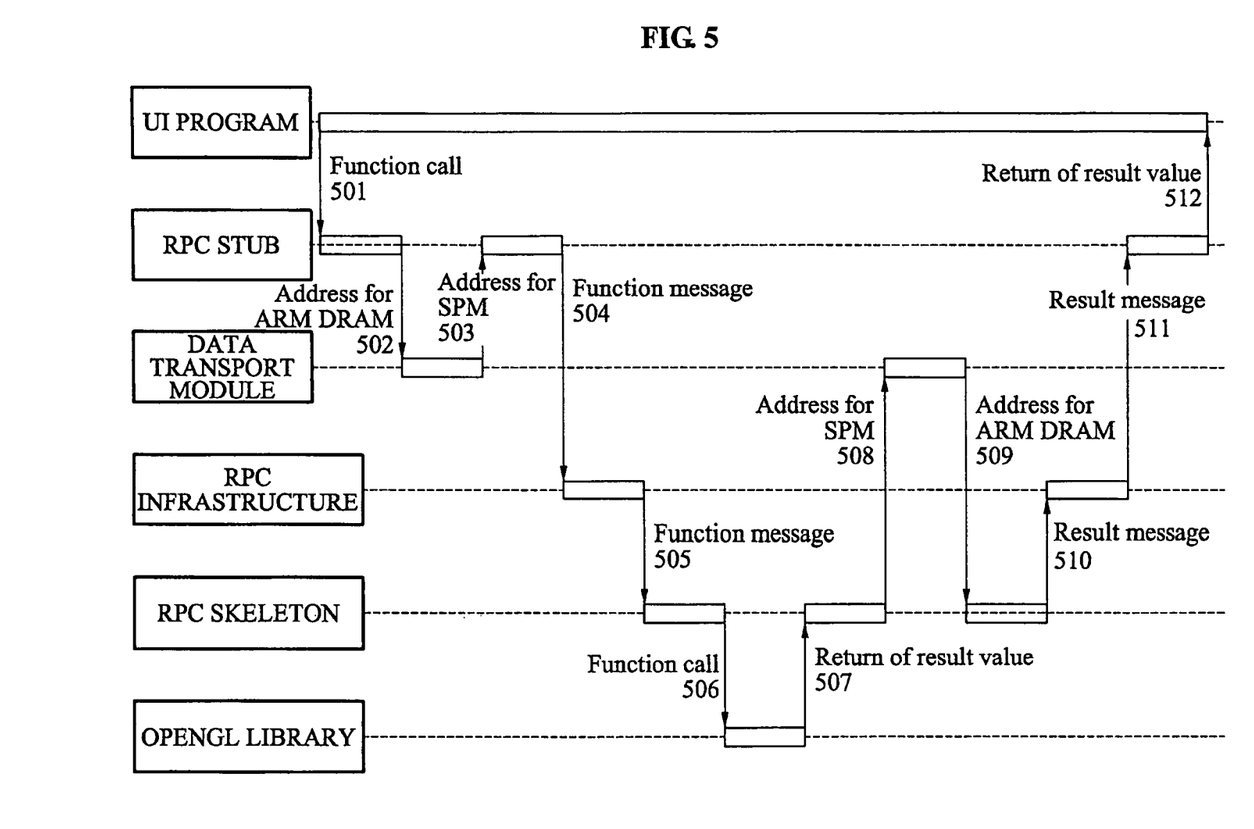
FIG. 5 illustrates a diagram of an RPC flow when a function caller and a function callee both have high data accessibility, according to example embodiments.

FIG. 5 illustrates an RPC flow when a function caller and a function callee both have high data accessibilities, according to example embodiments.

Referring to FIG. 5, when a UI program transfers a "function call" command to an RPC stub in operation 501, the RPC stub may transfer an address for an ARM DRAM to a data transport module, and may receive an address for an SPM returned by the data transport module in operations 502 and 503. In other words, in operations 502 and 503, data of the ARM DRAM may be copied to the SPM.

In operations 504 and 505, the RPC stub may convert a name and data of a function into a message, and may transfer the converted message to an RPC skeleton through an RPC infrastructure.

In operation 506, the RPC skeleton may restore the received message to its original form, namely, the name and data of the function, and may call the function in an OpenGL library. The called function may be executed to generate a result value, and the generated result value may be returned to the RPC skeleton in operation 507.

In operations 508 and 509, the RPC skeleton may transfer the address for the SPM to the data transport module, and may receive the address for the ARM DRAM returned by the data transport module. In other words, in operations 508 and 509, data of the SPM may be copied to the ARM DRAM.

In operation 510, the RPC skeleton may transfer a result message with the result value to the RPC infrastructure. In operation 511, the RPC infrastructure may transfer the received result message to the RPC stub.

In operation 512, the RPC stub may return the result value of the received result message to the UI program.

As described above, when the function caller and the function callee both have high data accessibilities, data of an input parameter may be copied from the ARM DRAM to the SPM, and data of an output parameter may be copied from the SPM to the ARM DRAM. Thus, it is possible to minimize the access time and avoid unnecessary data copy.

Figure 6:
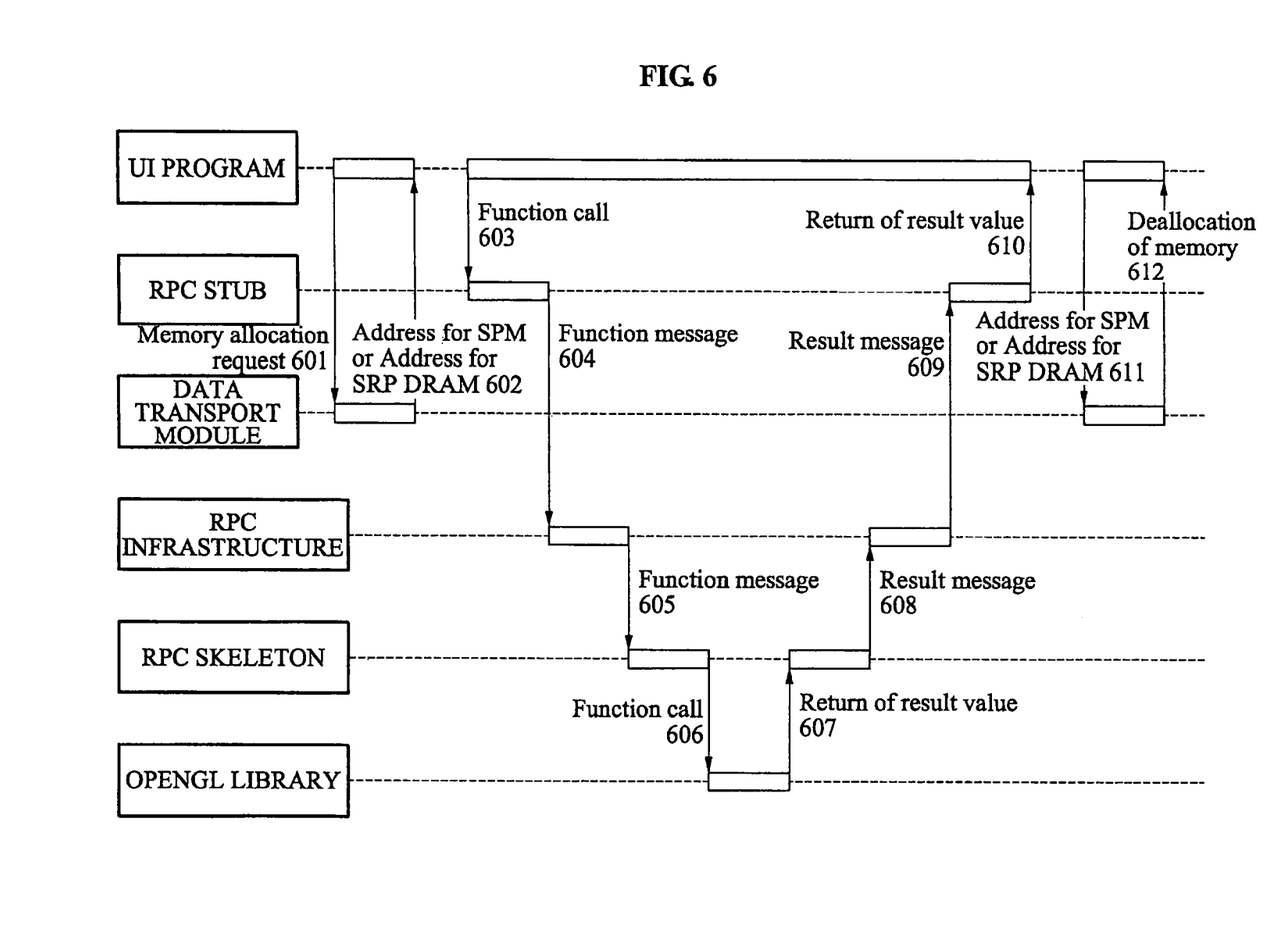
FIG. 6 illustrates a diagram of an RPC flow when a function callee has a high data accessibility, according to example embodiments.

FIG. 6 illustrates an RPC flow when a function callee has a high data accessibility, according to example embodiments.

Referring to FIG. 6, in operations 601 and 602, a UI program may request a data transport module to allocate a memory, and the data transport module may transfer an address for an SPM or an address for an SRP DRAM to the UI program.

When the UI program transfers a "function call" command to an RPC stub in operation 603, the RPC stub may convert a name and data of a function into a message and may transfer the converted message to an RPC skeleton through an RPC infrastructure in operations 604 and 605.

In operation 606, the RPC skeleton may restore the received message to its original form, namely, the name and data of the function, and may call the function in an OpenGL library. The called function may be executed to generate a result value, and the generated result value may be returned to the RPC skeleton in operation 607.

In operation 608, the RPC skeleton may transfer a result message with the result value to the RPC infrastructure. In operation 609, the RPC infrastructure may transfer the received result message to the RPC stub.

In operation 610, the RPC stub may return the result value of the received result message to the UI program.

In operations 611 and 612, the address for the SPM or the address for the SRP DRAM may be transferred to the data transport module, and a memory may be deallocated.

As described above, when the function callee has the high data accessibility, data of an input parameter and data of an output parameter may be stored in the SPM or the SRP DRAM that is located close to the function callee. Thus, it is possible to minimize the access time and avoid unnecessary data copy.

Figure 7:
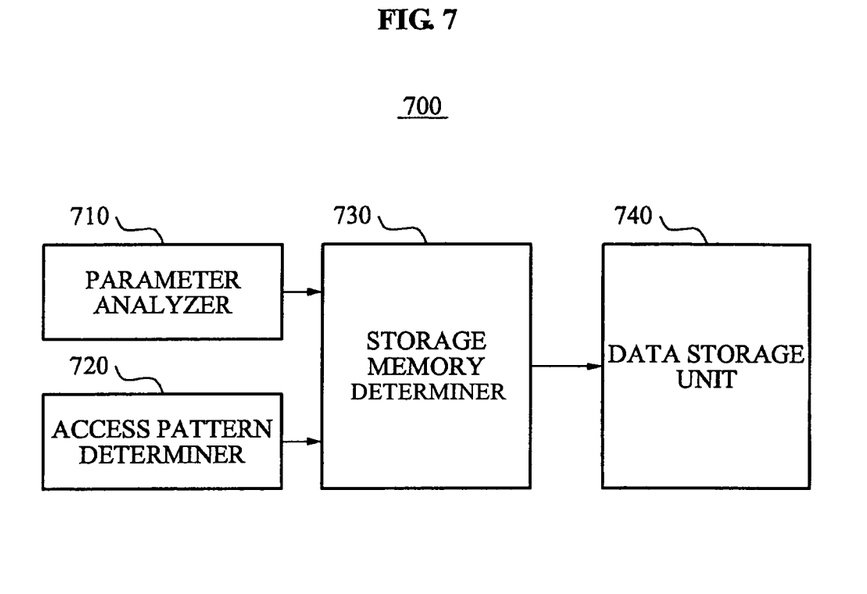
FIG. 7 illustrates a block diagram of an RPC data relocation device in a heterogeneous MPSoC according to example embodiments.

FIG. 7 illustrates a block diagram of an RPC data relocation device 700 in a heterogeneous MPSoC according to example embodiments.

Referring to FIG. 7, the RPC data relocation device 700 may include a parameter analyzer 710, an access pattern determiner 720, a storage memory determiner 730, and a data storage unit 740.

The parameter analyzer 710 may analyze a use of a parameter of a function. Specifically, the parameter may be used as either an input parameter or an output parameter.

The access pattern determiner 720 may determine a program with a highest accessibility to data associated with the parameter. Here, the accessibility may be determined using at least one of an access frequency, an access data size, and an access time. The access pattern determiner 720 may include an accessibility determiner (not shown) to determine an accessibility of a function caller to the data associated with the parameter and an accessibility of a function callee to the data associated with the parameter, and an access pattern classifier (not shown) to classify one or more access patterns based on the determined accessibilities.

The storage memory determiner 730 may determine a memory to store the data based on the use of the parameter and a location of the program with the highest accessibility. Specifically, the storage memory determiner 730 may determine whether the accessibility of the function caller is high, or whether the accessibility of the function callee is high, and may determine an appropriate memory where data is to be relocated in a location close to a program with a highest data accessibility, based on a result of the determining and the use of the parameter.

The data storage unit 740 may store data in the determined memory.

As described above, access data may be located close to a frequently accessed program, and thus, it is possible to minimize the data access time and avoid the unnecessary data copy.

Other descriptions of the RPC data relocation device 700 have been provided above with reference to FIGS. 1 to 6, and accordingly, additional descriptions are omitted herein.

As described above, in the heterogeneous MPSoC, the location of the memory where data is stored may be changed based on the use of the parameter and the access pattern.

Thus, it is possible to prevent costs from being incurred by data transfer between remote functions, and to minimize the data access time.

The method of relocating RPC data in a heterogeneous MPSoC according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. The non-transitory computer-readable media may be a plurality of computer-readable storage devices in a distributed network, so that the program instructions are stored in the plurality of non-transitory computer-readable storage devices and executed in a distributed fashion. The program instructions may be executed by one or more processors or processing devices. The non-transitory computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although embodiments have been shown and described, it should be appreciated by those skilled in the art that changes may be made in these embodiments without departing from the principles and spirit of the disclosure, the scope of which is defined in the claims and their equivalents.

What is claimed is:

1. A method of relocating Remote Procedure Call (RPC) data in a heterogeneous multiprocessor System-on-Chip (MPSoC), the method comprising:
   analyzing, by a computer, a use of a parameter of a function;
   determining, by the computer, a program with a highest accessibility to data associated with the parameter, based on whether at least one of a function caller and a function callee most frequently accesses the data associated with the parameter;
   determining, by the computer, a memory to store the data based on the analyzed use of the parameter and a location of the determined program; and
   storing, by the computer, the data in the determined memory.

2. The method of claim 1, wherein the analyzing of the use of the parameter comprises analyzing whether the parameter is used as one of an input parameter and an output parameter.

3. A method of relocating Remote Procedure Call (RPC) data in a heterogeneous multiprocessor System-on-Chip (MPSoC), the method comprising:

analyzing, by a computer, a use of a parameter of a function;

determining, by the computer, a program with a highest accessibility to data associated with the parameter;

determining, by the computer, a memory to store the data based on the analyzed use of the parameter and a location of the program; and storing, by the computer, the data in the determined memory, wherein the determining of the program comprises:

determining an accessibility of a function caller to the data associated with the parameter and an accessibility of a function callee to the data associated with the parameter; and classifying at least one access pattern based on the determined accessibilities.

4. The method of claim 3, wherein the determining of the accessibilities comprises using at least one of an access frequency, an access data size, and an access time.

5. The method of claim 3, wherein the classifying of the at least one access pattern comprises classifying the access patterns into one of a first pattern where the accessibility of the function caller is equal to or greater than a predetermined reference value, a second pattern where the accessibility of the function callee is equal to or greater than the predetermined reference value, a third pattern where both of the accessibility of the function caller and the accessibility of the function callee are equal to or greater than the predetermined reference value, and a fourth pattern where both the accessibility of the function caller and the accessibility of the function callee are less than the predetermined reference value.

6. The method of claim 5, wherein, when the access pattern is classified as the first pattern, the determining of the memory comprises determining a memory to store data associated with an input parameter and data associated with an output parameter, the memory located closest to the function caller.

7. The method of claim 5, wherein, when the access pattern is classified as the second pattern, the determining of the memory comprises determining a memory to store data associated with an input parameter and data associated with an output parameter, the memory located closest to the function callee.

8. The method of claim 5, wherein, when the access pattern is classified as the third pattern, the determining of the memory comprises determining a memory to copy data associated with an input parameter from a first memory to a second memory, and to copy data associated with an output parameter from the second memory to the first memory, the first memory located closest to the function caller and the second memory located closest to the function callee.

9. The method of claim 5, wherein, when the access pattern is classified as the fourth pattern, the determining of the memory comprises determining a first memory to store data associated with an input parameter and determining a second memory to store data associated with an output parameter, the first memory located closest to the function caller and the second memory located closest to the function callee.

10. At least one non-transitory computer-readable recording medium comprising computer readable instructions that control at least one processor to implement a method, comprising:

analyzing a use of a parameter of a function;

determining a program with a highest accessibility to data associated with the parameter, based on whether at least one of a function caller and a function callee most frequently accesses the data associated with the parameter;

determining a memory to store the data based on the analyzed use of the parameter and a location of the program; and storing the data in the determined memory.

11. A device relocating Remote Procedure Call (RPC) data in a heterogeneous multiprocessor System-on-Chip (MPSoC), the device comprising:

a parameter analyzer to analyze a use of a parameter of a function;

an access pattern determiner to determine a program with a highest accessibility to data associated with the parameter, based on whether at least one of a function caller and a function callee most frequently accesses the data associated with the parameter;

a storage memory determiner to determine a memory storing the data based on the analyzed use of the parameter and a location of the program; and a data storage unit to store the data in the determined memory.

12. The device of claim 11, wherein the parameter analyzer analyzes whether the parameter is used as one of an input parameter and an output parameter.

13. A device relocating Remote Procedure Call (RPC) data in a heterogeneous multiprocessor System-on-Chip (MPSoC), the device comprising:

a parameter analyzer to analyze a use of a parameter of a function;

an access pattern determiner to determine a program with a highest accessibility to data associated with the parameter;

a storage memory determiner to determine a memory storing the data based on the analyzed use of the parameter and a location of the program; and a data storage unit to store the data in the determined memory, wherein the access pattern determiner comprises:

an accessibility determiner to determine an accessibility of a function caller to the data associated with the parameter and an accessibility of a function callee to the data associated with the parameter; and an access pattern classifier to classify at least one access pattern based on the determined accessibilities.

14. The device of claim 13, wherein the accessibility determiner uses at least one of an access frequency, an access data size, and an access time.

15. The device of claim 13, wherein the access pattern classifier classifies the access patterns into one of a first pattern where the accessibility of the function caller is equal to or greater than a predetermined reference value, a second pattern where the accessibility of the function callee is equal to or greater than the predetermined reference value, a third pattern where both of the accessibility of the function caller and the accessibility of the function callee are equal to or greater than the predetermined reference value, and a fourth pattern where both the accessibility of the function caller and the accessibility of the function callee are less than the predetermined reference value.

16. The device of claim 15, wherein, when the access pattern is classified as the first pattern, the storage memory determiner determines a memory to store data associated with an input parameter and data associated with an output parameter, the memory located closest to the function caller.

17. The device of claim 15, wherein, when the access pattern is classified as the second pattern, the storage memory determiner determines a memory to store data associated with an input parameter and data associated with an output parameter, the memory located closest to the function callee.

18. The device of claim 15, wherein, when the access pattern is classified as the third pattern, the storage memory determiner determines a memory to copy data associated with an input parameter from a first memory to a second memory, and to copy data associated with an output parameter from the second memory to the first memory, the first memory located closest to the function caller and the second memory located closest to the function callee.

19. The device of claim 15, wherein, when the access pattern is classified as the fourth pattern, the storage memory determiner determines a first memory to store data associated with an input parameter and determines a second memory to store data associated with an output parameter, the first memory located closest to the function caller and the second memory located closest to the function callee.

* * * * *